United States Patent
Maki et al.

(10) Patent No.: US 6,918,947 B2
(45) Date of Patent: Jul. 19, 2005

(54) METHOD FOR MAKING REDUCED IRON

(75) Inventors: Takeshi Maki, Kakogawa (JP);
Yoshiyuki Matsui, Kakogawa (JP);
Takeshi Sugiyama, Kobe (JP); Takao Harada, Kobe (JP); Masahiko Tetsumoto, Kobe (JP); Hiroshi Tamazawa, Kobe (JP); Tadashi Ueda, Kakogawa (JP); Koichi Morioka, Kakogawa (JP); Nobuyuki Iwasaki, Kakogawa (JP); Hidetoshi Tanaka, Kobe (JP); Kojiro Fuji, Kobe (JP); Hiroshi Sugitatsu, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 68 days.

(21) Appl. No.: 10/395,340

(22) Filed: Mar. 25, 2003

(65) Prior Publication Data

US 2003/0188603 A1 Oct. 9, 2003

(30) Foreign Application Priority Data

Apr. 3, 2002 (JP) .................................. 2002-101288
Apr. 3, 2002 (JP) .................................. 2002-101667

(51) Int. Cl.⁷ ............................................. C21B 13/08
(52) U.S. Cl. ........................... 75/484; 75/656; 423/107
(58) Field of Search ................... 75/484, 656; 423/107

(56) References Cited

U.S. PATENT DOCUMENTS

| 5,601,631 | A |   | 2/1997  | Rinker et al. |
| 5,885,521 | A |   | 3/1999  | Meissner et al. |
| 5,989,019 | A |   | 11/1999 | Nishimura et al. |
| 6,063,156 | A |   | 5/2000  | Negami et al. |
| 6,120,577 | A | * | 9/2000  | Koros et al. ................. 75/483 |
| 6,129,777 | A |   | 10/2000 | Fuji et al. |
| 6,149,709 | A |   | 11/2000 | Uragami et al. |
| 6,152,983 | A |   | 11/2000 | Kamijo et al. |
| 6,241,803 | B1 |  | 6/2001  | Fuji |
| 6,251,161 | B1 |  | 6/2001  | Tateishi et al. |
| 6,254,665 | B1 |  | 7/2001  | Matsushita et al. |
| 6,258,149 | B1 |  | 7/2001  | Sugiyama et al. |

(Continued)

FOREIGN PATENT DOCUMENTS

| EP | 0 916 742   | 5/1999  |
| EP | 0 924 304   | 6/1999  |
| EP | 1 357 195   | 10/2003 |
| JP | 7-122104    | 12/1995 |
| JP | 10-219361   | 8/1998  |
| JP | 11-269565   | 10/1999 |
| JP | 2001-303115 | 10/2001 |

OTHER PUBLICATIONS

T. Ibaraki, et al., "Dust Recycling Technology by the Rotary Hearth Furnace at Nippon Steel's Kimitsu Works", La Revue de Metallurgie–CIT, vol. 99, No. 10, XP–001144959, Oct. 2002, pp. 809–818.
Karl–Heinz Bauer, et al., "Aufarbeitung von Hüttenreststoffen nach dem inmetco–Direktreduktionsverfahren", Stahl und Eisen, vol. 110, No. 7, XP–000161338, Jul. 13, 1990, pp. 89–96 (and p. 202, English Summary).
Patent Abstracts of Japan, JP 2003–089823, Mar. 28, 2003.
U.S. Appl. No. 10/508,546, filed Sep. 28, 2004, Sugitatsu et al.
U.S. Appl. No. 10/395,340, filed Mar. 25, 2003, Maki et al.

*Primary Examiner*—Melvyn Andrews
(74) *Attorney, Agent, or Firm*—Oblon, Spivak, McClelland, Maier & Neustadt, P.C.

(57) ABSTRACT

A method for making reduced iron using blast-furnace sludge is provided. The method includes a mixing step of mixing the blast-furnace sludge and an iron-oxide-containing powder to prepare a mixed material, an agglomerating step of agglomerating the mixed material to form agglomerates, a feeding step of feeding the agglomerates onto a continuously moving hearth, and a reducing step of heating the agglomerates to remove zinc and reduce the agglomerates.

13 Claims, 5 Drawing Sheets

U.S. PATENT DOCUMENTS

| | | |
|---|---|---|
| 6,296,479 B1 | 10/2001 | Nishimura et al. |
| 6,302,938 B1 | 10/2001 | Kamijo et al. |
| 6,319,302 B1 | 11/2001 | Harada |
| 6,334,883 B1 | 1/2002 | Takenaka et al. |
| 6,368,379 B1 * | 4/2002 | Tateishi et al. ............... 75/484 |
| 6,413,295 B2 | 7/2002 | Meissner et al. |
| 6,500,381 B1 | 12/2002 | Harada |
| 6,503,289 B2 | 1/2003 | Tanigaki et al. |
| 6,511,316 B2 | 1/2003 | Harada et al. |
| 6,517,770 B1 | 2/2003 | Tateishi et al. |
| 6,521,171 B2 | 2/2003 | Tateishi et al. |
| 6,755,888 B2 * | 6/2004 | Ibaraki et al. ................ 75/414 |

* cited by examiner

METHOD FOR MAKING REDUCED IRON

BACKGROUND OF THE INVENTION

1. Field of the Invention

The present invention relates to a method for making reduced iron using blast-furnace sludge.

2. Description of the Related Art

Blast-furnace dust can be classified into relatively coarse dry dust collected by a dry system and sludge consisting of fine particles collected by a wet system. Dry dust has a relatively low zinc content when compared with that of sludge, and can be recycled as the material for sintered ore. In contrast, sludge having a high zinc content requires zinc-removing processes before being recycled as a blast-furnace feed material.

Recently, various methods for processing dust have been investigated. As a result of the investigation, a rotary hearth furnace method including the steps of agglomerating a mixture of an iron-oxide-containing substance, such as iron ore or dust, and a carbonaceous reductant and heating the resulting agglomerates in a rotary hearth furnace so as to obtain reduced iron has been put to practical application. According to this method, dust containing iron oxides can be reduced and can be effectively recycled as an iron source while achieving high production efficiency and low equipment cost.

In a rotary hearth furnace method, green pellets containing water are dried before they are fed to a rotary hearth furnace. The drying is necessary to prevent the pellets from bursting due to sudden evaporation during heating, i.e., to prevent "bursting" inside the furnace.

According to a known technique, when pellets made from a mixture of iron ore as the iron-oxide material and a carbonaceous material such as coal are used, the pellets are dried to reduce the water content thereof to 1 percent by mass or less. With this technique, bursting of the pellets inside the furnace can be prevented and handling strength, i.e., shattering strength, crushing strength, or the like, that can sufficiently withstand the feeding operation described above can be obtained.

However, when pellets contain blast-furnace sludge, the pellets break into chips and fines when they are fed inside the rotary hearth furnace even though they are dried to a water content of 1 percent by mass or less. As a result, a significant degree of pulverization occurs, and handling of the resulting reduced iron product becomes extremely difficult. This results in a decrease in metallization degree of the resulting reduced iron product, a decrease in zinc-removal rate, and a decrease in yield. Furthermore, a large amount of iron oxide becomes mixed in the recovered crude zinc oxide, thereby degrading the quality as the zinc oxide material.

Another known method for making reduced iron includes the steps of dehydrating a mixture containing undried blast-furnace sludge and so on by squeezing, extruding the resulting dehydrated mixture to form compacts, and feeding the compacts into a rotary hearth furnace without drying the compacts so as to perform drying, heating, and reducing of the compacts. According to this method, the degree of dehydration and the degree of powder filling are adjusted to prevent the compacts from bursting inside the furnace. However, since blast-furnace sludge expands during reduction as described below, breaking of the compacts cannot be effectively prevented by merely avoiding bursting resulting from water evaporation. Moreover, since the compacts are dried on the rotary hearth before reduction, the compacts remain in the furnace for a long time, thereby requiring a large hearth and a large-scale reduction plant.

SUMMARY OF THE INVENTION

The present invention aims to overcome the above-described problems. An object of the present invention is to provide a method for making reduced iron whereby breaking of agglomerates containing blast-furnace sludge into pieces and/or fines is avoided inside the furnace, reduced iron products of high metallization degrees can be produced at high yield, and high-grade zinc material, i.e., crude zinc oxide, can be recovered during the course.

An aspect of the present invention provides a method for making reduced iron using blast-furnace sludge, comprising a mixing step of mixing the blast-furnace sludge with an iron-oxide-containing powder and/or a carbonaceous powder to prepare a mixed material; an agglomerating step of agglomerating the mixed material to form agglomerates; a feeding step of feeding the agglomerates onto a continuously moving hearth; and a reducing step of heating the agglomerates to remove zinc as well as to reduce the agglomerates.

Preferably, the mixed material has an excess carbon ratio Sc that satisfies relationship (1):

$$Sc \leq 8 - 2NL \qquad (1)$$

wherein $Sc = XC - (12/16) \cdot XO$, NL represents an average number of layers of the agglomerates on the moving hearth, XC represents the mass ratio (percent by mass) of carbon in the agglomerates in a dry state, and XO represents a total mass ratio (percent by mass) of oxygen in iron oxides and oxygen in zinc oxide in the dry agglomerates.

Preferably, the mixed material has an excess carbon ratio Sc that satisfies the relationship (2):

$$Sc \leq 8 - 2NL + 0.02YD \qquad (2)$$

wherein $Sc = XC - (12/16) \cdot XO$, NL represents an average number of layers of agglomerates on the hearth, $YD = 100 XC_B / XC$, XC represents a mass ratio (percent by mass) of carbon in dried agglomerates, XO represents a total mass ratio (percent by mass) of oxygen in iron oxides and oxygen in zinc oxide in the agglomerates in a dry state, and $XC_B$ represents a mass ratio (percent by mass) of carbon in the iron-oxide-containing powder and/or the carbonaceous powder in the dry agglomerates.

Preferably, in the feeding step, the average number NL is 1.0 or less.

Each of the above-described methods may further include a disintegrating step of disintegrating the blast-furnace sludge.

Preferably, in the disintegrating step, the blast-furnace sludge containing pseudoparticles having a diameter exceeding 1 mm is disintegrated to reduce the mass ratio of the pseudoparticles having a diameter exceeding 1 mm to the mixed material to 50% or less.

More preferably, the mixed material has a mass ratio XQ (percent by mass) of pseudoparticles having a diameter exceeding 1 mm and an excess carbon ratio Sc (percent by mass) that satisfy relationship (3):

when $0 \leq Sc \leq 2$, $XQ \leq 50$; and when $2 < Sc \leq 6$, $XQ \leq 70 - 10 \cdot Sc \qquad (3)$ wherein $Sc = XC - (12/16) \cdot XO$, XC is a mass ratio (percent by mass) of carbon in the agglomerates in a dry state, and XO is a total mass ratio (percent by mass) of oxygen in iron oxides and oxygen in zinc oxide in the dry agglomerates.

Yet more preferably, the mixed material has a mass ratio XQ (percent by mass) of pseudoparticles having a diameter exceeding 1 mm and a excess carbon ratio Sc (unit: percent by mass) that satisfy relationship (4):

when $0 \leq Sc \leq 1$, $XQ \leq 50$; and when $1 < Sc \leq 6$, $XQ \leq 60 - 10 \cdot Sc$           (4)

wherein $Sc = XC - (12/16) \cdot XO$, XC is a mass ratio (percent by mass) of carbon in the agglomerates in a dry state, and XO is a total mass ratio (percent by mass) of oxygen in iron oxides and oxygen in zinc oxide in the dry agglomerates.

The method may further include an agglomerates-drying step of drying the agglomerates to reduce the water content thereof to 1.0 percent by mass or less.

The method may further include a blast-furnace-sludge-drying step of drying the blast-furnace sludge to reduce the water content thereof to a predetermined value so that the water content of the mixed material becomes 1.0 percent by mass or less.

Preferably, the method further includes a zinc-recovering step of recovering zinc compounds resulting from zinc removal to obtain crude zinc oxide.

According to the present invention, pellets can be prevented from breaking into chips and fines during reduction, and reduced iron products having a high zinc removal rate and a high metallization degree can be produced at a high yield. Moreover, the quality of zinc oxide recovered from the exhaust gas of the furnace can be dramatically improved.

DESCRIPTION OF THE PREFERRED EMBODIMENTS

Figure 1:
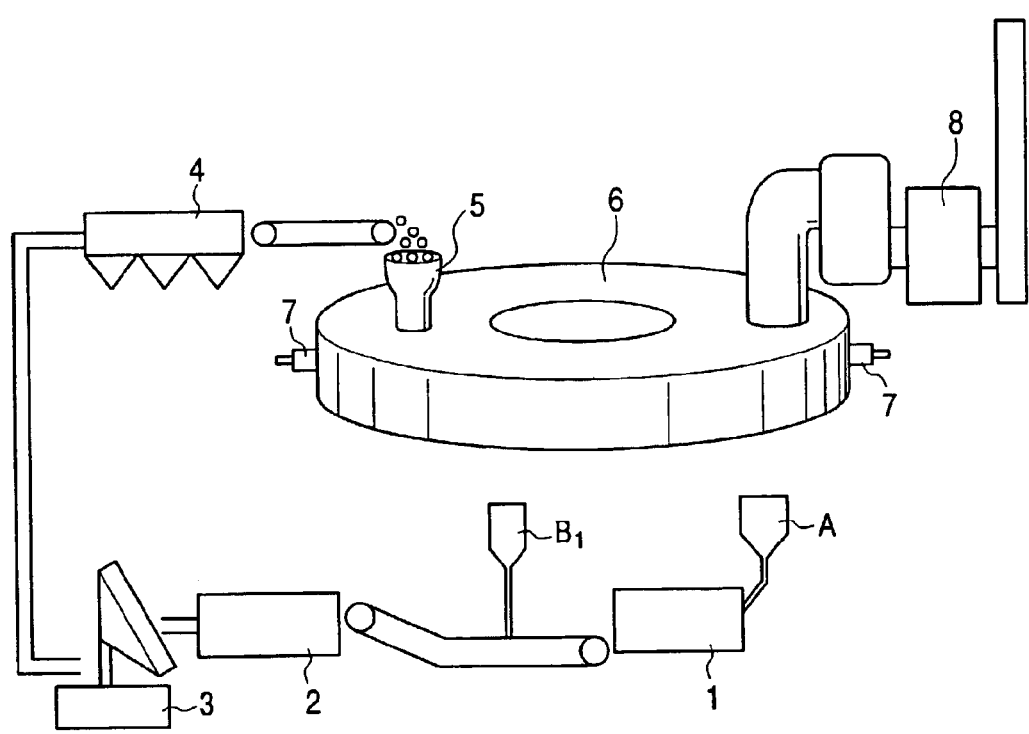
FIG. 1 is a schematic diagram showing a plant that implements a method for making reduced iron using blast-furnace sludge according to a first embodiment of the present invention.

In order to identify the cause of breaking of agglomerates containing blast-furnace sludge inside the furnace, the present inventors have examined the microstructure of blast-furnace sludge and the microstructure of blast-furnace-sludge-containing pellets after reduction. As a result of the examination, the cause of breaking was found to be as follows.

Blast-furnace sludge consists of fine dust in top gas of a blast furnace collected by a wet dust collector and thus has a high water content. Blast-furnace sludge is dehydrated and dried in a rotary dryer, a fluidized-bed dryer, or the like to enhance transfer convenience. However, since excessively dried blast-furnace sludge generates dust during transfer, i.e., particularly during transfer by an open-air dump truck, the water content thereof is generally controlled to approximately 10 to 30 percent by mass.

Moreover, blast-furnace sludge contains a large amount of, i.e., generally 20 to 40 mass percent of, carbon in addition to iron oxides and zinc oxide. Accordingly, when the blast-furnace sludge alone is agglomerated and reduced by heating, a large amount of carbon remains even after reduction of iron oxides and zinc oxide.

As described above, the blast-furnace sludge is half dried so that some amount of water remains in the blast-furnace sludge. Generally, a fine substance cannot be uniformly dried. A large number of portions having a high water content remain in the half-dried fine substance, and these portions form pseudoparticles as they are agitated in a dryer. Pseudoparticles consisting of fine particles are remarkably hard and are not easily crushed by such an impact as that imposed during agitation in a mixer during a mixing step.

Powder that was contained in reduced iron products was observed with a microscope. According to the observation, metallic iron produced by reduction was whisker-shaped. Pellet samples composed of only blast-furnace sludge were separately prepared and reduced by heating in a small furnace. The reduced pellet samples were then observed with a microscope. According to the observation, the metallic iron whiskers similar to those described above were found. This demonstrates that the blast-furnace sludge greatly expanded during reduction because the blast-furnace sludge consisting of finer particles allowed a rapid reduction and permitted metallic iron whiskers to readily grow.

Accordingly, when pellets containing a large number of pseudoparticles are heated in a rotary hearth furnace, the pseudoparticles consisting of only blast-furnace sludge significantly expand during reduction while the portions having a less amount of blast-furnace sludge do not expand as much as the pseudoparticles. As a result, stress concentration occurs around the surfaces of the pseudoparticles, thereby generating cracks, which develop into pellet breaking and pellet pulverization.

Moreover, since agglomerates are heated with burners inside the rotary hearth furnace, the oxidizing components such as $CO_2$ and $H_2O$ in combustion gas of the burners partly consumes carbon in the agglomerates due to a solution-loss reaction, thereby reoxidizing the reduced metallic iron. In order to obtain sufficiently high zinc-removal rate and metallization degree, carbon is added to the agglomerates at an amount exceeding the amount of carbon theoretically required to completely reduce zinc oxide and iron oxides. However, when the amount of carbon is too large, carbon remains in the agglomerates even after completion of metallization, and the carbon particles as well as generated metallic iron whiskers inhibit metallic iron from sintering, thereby causing breaking of the agglomerates.

In view of the above, the present invention prevents agglomerates from breaking by reducing the number of pseudoparticles, which would cause stress concentration, as much as possible prior to agglomeration, and by limiting the amount of carbon contained in the agglomerates or by limiting the amount of blast-furnace sludge, which generates metallic iron whiskers, contained in the agglomerates.

The present invention will now be described in terms of preferred embodiments.

First Embodiment

FIG. 1 is a schematic diagram showing a plant by which a method of the present invention for making reduced iron (a method for making crude zinc oxide) using blast-furnace sludge is implemented.

As has been previously described, since blast-furnace sludge having a high water content may contain a large number of pseudoparticles, the blast-furnace sludge is preferably disintegrated in advance. Referring to FIG. 1, blast-furnace sludge A containing pseudoparticles having a diameter exceeding 1 mm is disintegrated using a disintegrator 1 so that the ratio of the pseudoparticles to the mixed material prepared as below becomes 50 percent by mass or less (disintegrating step). Examples of the disintegrator 1 include a rod mill, a ball mill, and a jaw crusher.

An iron-oxide-containing powder B1 containing iron oxides is added to the disintegrated blast-furnace sludge A. Examples of the iron-oxide-containing powder B1 include iron ore powder, and steel mill wastes such as basic-oxygen-furnace dust, electric-furnace dust, mill scale, and mill sludge. Water may be added if necessary. A binder such as starch or bentonite may also be added. The amount of the additive iron-oxide-containing powder B1 is adjusted to satisfy the relationship (1):

$$Sc \leq 8-2NL \quad (1)$$

wherein $Sc=XC-(12/16)\cdot XO$, NL represents an average number of layers of agglomerates, e.g., pellets, placed on the hearth, XC represents the mass ratio (mass percent) of carbon in the agglomerates in a dry state, and XO represents the total mass ratio (mass percent) of oxygen in iron oxides and oxygen in zinc oxide in the dry agglomerates.

In relationship (1), Sc represents an excess carbon ratio. The excess carbon ratio indicates the amount of carbon that exceeds the amount of carbon theoretically required to completely reduce zinc oxide and iron oxides to metallic zinc and metallic iron, respectively. The average number NL of layers refers to the thickness of the layer of agglomerates (pellets) divided by the average diameter of the agglomerates (pellets). The thickness of the layer is determined based on the assumption that the agglomerates are tightly and closely bedded on the hearth with no space therebetween. When the agglomerates are not spherical, e.g., when the agglomerates are briquettes and not pellets, this closely bedded state is when the agglomerates are placed on the hearth at their most stable position, i.e., placed in such a manner that the thickness direction of the agglomerates coincides with the thickness direction of the layer. Here, NL=1 when the agglomerates placed in this manner are closely bedded in a single layer. Accordingly, relationship (1) shows that the upper limit of the excess carbon ratio SC changes according to the average number NL of the agglomerate (pellet) layers.

It should be noted here that an excessively small excess carbon ratio Sc results in insufficient zinc-removal and insufficient metallization of the pellets. Since metallization of iron is more difficult than zinc removal, the excess carbon ratio Sc should be at least −1, preferably at least 0, and most preferably at least 1 when high metallization degree is required. The materials prepared as above are mixed in a mixer 2 to obtain a mixed material (mixing step). An example of the mixer 2 is a drum mixer.

The mixed material is agglomerated into green pellets with an agglomerator such as a pan pelletizer or a drum pelletizer (agglomerating step).

The green pellets are dried to reduce the water content to 1 percent by mass or less by a dryer 4 such as a grate dryer so as to prepare dry pellets (agglomerates-drying step). Since pseudoparticles of blast furnace sludge are disintegrated to a certain extent before they are agglomerated, the time taken for drying the pellets is shortened.

The dry pellets are placed on a horizontally rotating hearth (not shown) of a rotary hearth furnace 6 using a feeder 5 (feeding step). The average number of the dry pellet layers is controlled to a predetermined value. Since the layers of pellets on the hearth are heated by radiation from the burners above, the temperatures of the layers are gradually increased from the top to the bottom. Accordingly, when the average number of pellet layers is large, the pellets at the bottom layer are not sufficiently heated, resulting in incomplete zinc-removal and incomplete metallization. In other words, the higher the production of the reduced iron, the lower the quality of the reduced iron products, and vice versa. From this point of view, the average number of the pellet layers is preferably 2 or less. As is apparent from relationship (1), the smaller the average number of the pellet layers, the higher the upper limit of the excess carbon ratio. Here, the term "upper limit of the excess carbon ratio" refers to the maximum excess carbon ratio that can prevent pellets from breaking. In other words, when the average number of the pellet layers is small, the pellets can contain a large amount of blast furnace sludge having a high carbon content without suffering from breaking, thereby increasing the processing amount of blast-furnace sludge. Thus, the average number of the pellet layers is preferably 1 or less.

The upper limit of the excess carbon ratio rises as the average number of the pellet layers decreases. This is because the pellet layers can be rapidly heated to the bottom and the reduction of the pellet layers as a whole can be rapidly completed to obtain enough time for metallic iron to sinter. Accordingly, the resulting pellets, i.e., the reduced iron, as a whole can exhibit increased strength. However, when the average number of pellets is excessively small, the area of the hearth not effectively used for pellet reduction increases, resulting in a decrease in production efficiency of the rotary hearth furnace. Thus, the average number of pellet layers is preferably 0.5 or more.

As the pellets travel through the rotary hearth furnace 6 by the rotation of the hearth, they are heated with burners 7 installed above the hearth to completely remove water remaining in the pellets. When the pellets are heated to a temperature of 1,200° C. or more, reduction begins (reducing step). During the reduction, blast furnace sludge may expand, but since the excess carbon ratio is controlled to satisfy relationship (1), pellets are prevented from breaking.

The reduction proceeds while zinc oxide and iron oxides are in close contact with carbon inside the pellets. As a result, reduced iron products having high zinc-removal ratio and high metallization degree can be produced at high yield.

Zinc oxide in the furnace exhaust gas is recovered by a dust collector 8 after the gas is cooled (zinc-recovering step). An example of the dust collector is a bag filter. Since pellets are prevented from breaking inside the furnace, recovered zinc oxide has a low concentration of contaminants such as iron. Thus, high-quality crude zinc oxide, which is a valuable feed material for producing metallic zinc, can be recovered.

Second Embodiment

Figure 2:
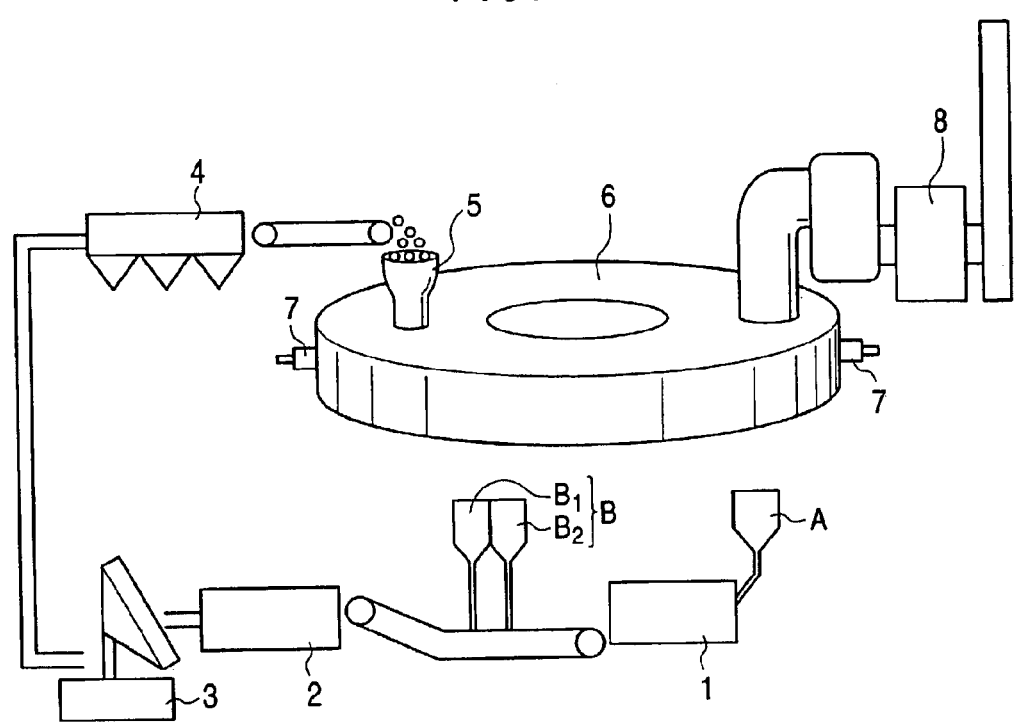
FIG. 2 is a schematic diagram showing a plant that implements a method for making reduced iron using blast-furnace sludge according to a second embodiment of the present invention.

A second embodiment of the present invention will now be described with reference to FIG. 2. In the mixing step of the first embodiment described above, a carbonaceous powder B2 containing carbon may be added instead of or in addition to the iron-oxide-containing powder B1. Here, the mixture of the iron-oxide-containing powder B1 and the carbonaceous powder B2, and the carbonaceous powder B2 alone are collectively referred to as a powder material B containing either carbon or carbon and iron oxide. Examples of the carbonaceous powder B2 include coal powder, coke powder, petroleum coke powder, coke dry quencher (CDQ) powder, charcoal powder, carbide powder of wastes, and blast-furnace dry dust. The amount of the powder material B added is adjusted to satisfy relationship (2):

$$Sc \leq 8-2NL+0.02YD \qquad (2)$$

wherein $Sc=XC-(12/16) \cdot XO$, NL represents the average number of the agglomerate (pellet) layers on the hearth, $YD=100XC_B/XC$, XC is a carbon content (percent by mass) in the dried agglomerates, XO is a total content (percent by mass) of oxygen in iron oxides and oxygen in zinc oxide, and $XC_B$ is a carbon content (percent by mass) in the powder material B in the dried agglomerates.

In relationship (2), YD represents the carbon substitution ratio. The carbon substitution ratio indicates the extent of which carbon in the blast-furnace sludge is substituted by carbon in the powder material B. In particular, the carbon substitution ratio YD=amount of carbon in the powder material B in the dried agglomerates/total amount of carbon in the dried agglomerates×100. Here, only fixed carbon is considered as a substitutable carbon in the carbonaceous powder B2. For example, when a mixed material contains 21% of blast-furnace sludge having a carbon content of 36.6%, 14% of coal having a fixed carbon content of 71%, and 65% of basic-oxygen-furnace dust having a carbon content of 1%, the carbon substitution ratio YD is calculated as follows:

$$YD = (14 \times 71 + 65 \times 1)/(21 \times 36.6 + 14 \times 71 + 65 \times 1) \times 100$$

$$= 57.9\%$$

Accordingly, relationship (2) shows that the upper limit of the excess carbon ratio Sc changes depending not only on the average number NL of the pellet layers but also on the carbon substitution ratio YD.

The agglomerating step, the feeding step, and the reducing step are then performed as in the first embodiment. Relationship (2) shows that, during the reduction, the upper limit of the excess carbon ratio, which is the maximum ratio that can prevent pellets from breaking during the reduction, can be increased by increasing the carbon substitution ratio YD. In other words, pellets are prevented from breaking without excessively reducing the average number of pellet layers and without decreasing the excess carbon ratio. Accordingly, both high productive efficiency and high pellet quality can be achieved.

The upper limit of the excess carbon ratio Sc, which is the maximum ratio that can prevent pellets from breaking, increases as the carbon substitution ratio YD increases. This is because the powder material that replaced the blast-furnace sludge is coarser than blast-furnace sludge. As a result, the reduction reaction becomes slow and metallic iron whiskers are rarely produced. Moreover, whereas carbon in the blast-furnace sludge is completely homogeneously mixed with iron oxides and the like and thus undergoes a rapid reduction reaction, carbon in the powder material is not completely homogeneously mixed with iron oxides and the like even after the mixing step. Thus, the reduction reaction becomes slow, and metallic iron whiskers are rarely produced.

Third Embodiment

Referring to FIG. 1, blast-furnace sludge A containing pseudoparticles having a diameter exceeding 1 mm is disintegrated using a disintegrator 1 until the ratio of the pseudoparticles having a diameter exceeding 1 mm to the mixed material is 50 percent by mass or less (disintegrating step). Examples of the disintegrator include crushers and grinders such as a roll mill, a rod mill, a ball mill, and a jaw crusher. A powder material B containing iron oxides is blended into the disintegrated blast-furnace sludge A. Examples of the powder material B include steel mill wastes such as iron ore powder, basic-oxygen-furnace dust, electric-furnace dust, mill scale, and mill sludge. Water may also be added if necessary. Furthermore, a carbonaceous substance such as coal, coke, petroleum coke, or the like, or a binder such as starch, bentonite, or the like may be added. The resulting mixture is mixed in a mixer 2 so as to prepare a mixed material (mixing step). Examples of the mixer 2 include a drum mixer and a paddle mixer. The mixed material is then agglomerated into green pellets using a known agglomerator 3 (agglomerating step). Examples of the agglomerator 3 include a pan pelletizer and a drum pelletizer. The green pellets are dried using a dryer 4 until the water content thereof is 1 percent by mass or less so as to prepare dry pellets (drying step). An example of the dryer 4 is a grate dryer. Since pseudoparticles contained in the blast-furnace sludge are disintegrated in advance to some extent before agglomeration, the time taken for drying is short. The dry pellets are placed on a horizontally rotating hearth (not shown) of a rotary hearth furnace 6 in one to two layers. The pellets are heated by radiation from burners 7 installed above the hearth as the pellets travel through the rotary hearth furnace 6 (reducing step). This heating is required to completely remove water remaining in the pellets and to increase the temperature of the pellets to approximately at least 1,200° C. so as to start reduction. Since the ratio of the pseudoparticles having a diameter exceeding 1 mm in the pellets is controlled in a predetermined range, the pellets are prevented from breaking even when blast-furnace sludge containing pseudoparticles expands during the reduction. Accordingly, the reduction reaction proceeds while carbon, zinc oxide, and iron oxides in the pellets are in close contact with each other. As a result, reduced iron products having high zinc-removal rate and metallization degree can be obtained at high yield.

Zinc oxide in the furnace exhaust gas is recovered by a dust collector 8 after the gas is cooled (zinc-recovering step). An example of the dust collector is a bag filter. Since pellets are prevented from generating fines due to pellet disruption during the reduction inside the furnace, recovered zinc oxide has a low concentration of contaminants such as iron. Thus, high quality crude zinc oxide, which is a valuable feed material for producing metallic zinc, can be recovered.

The pseudoparticles in the mixed material are preferably disintegrated in a manner that satisfies relationship (3) that shows the relationship between the mass ratio XQ (unit: percent by mass) of the pseudoparticles having a diameter exceeding 1 mm and the excess carbon ratio Sc (unit: percent by mass):

when $0 \leq Sc \leq 2$, $XQ \leq 50$; and when $2 < Sc \leq 6$, $XQ \leq 70-10 \cdot Sc$ \qquad (3)

wherein Sc=XC−(12/16)·XO, XC is a mass ratio (percent by mass) of carbon in the dried agglomerates, and XO is a total mass ratio (percent by mass) of oxygen in iron oxides and oxygen in zinc oxide in the dried agglomerates.

As shown above, the higher the excess carbon ratio Sc, the larger the amount of carbon that exceeds the amount theoretically required to completely reduce zinc oxide and iron oxides. Since pellets are heated in the rotary hearth furnace 6 using burners, oxidizing components, such as $CO_2$ and $H_2O$, in the combustion gas of the burners partly consume carbon of the pellets by a solution-loss reaction, thereby reoxidizing the reduced metallic iron. Thus, an adequate amount of excess carbon is required to achieve sufficiently high metallization degree. High zinc-removal rate and high metallization degree can be achieved by increasing the amount of excess carbon, i.e., the excess carbon ratio Sc. However, carbon inhibits sintering of metallic iron and thus causes pellets to break into pieces when the amount of the carbon in the pellets is increased. To prevent breaking into pieces, the mass ratio XQ of the pseudoparticles having a diameter exceeding 1 mm is decreased as the excess carbon ratio Sc is increased.

Note that when $0 \leq Sc \leq 2$, decreasing the mass ratio XQ of the pseudoparticles having a diameter exceeding 1 mm is not necessary even when the excess carbon ratio Sc is increased. This is because, at an excess carbon ratio Sc within this range, carbon rarely remains in the metallic iron because of the solution-loss reaction described above and thus does not inhibit sintering of the metallic iron. When $Sc>6$, the amount of carbon remaining in the reduced iron becomes excessively large, and sintering of metallic iron is significantly inhibited. Within this range, breaking of the pellets cannot sufficiently be prevented even when the pseudoparticles having a diameter exceeding 1 mm are completely disintegrated.

More preferably, the mass ratio XQ of the pseudoparticles having a diameter exceeding 1 mm is further limited to satisfy relationship (4) below so as to reliably prevent the reduced pellets from breaking:

when $0 \leq Sc \leq 1$, $XQ \leq 50$; and when $1 < Sc \leq 6$, $XQ \leq 60 - 10 \cdot Sc$ \hfill (4)

Although the above-described first to third embodiments use pellets as agglomerates, agglomerates are not limited to pellets. Agglomerates may be briquettes, tabular compacts, columnar compacts, or the like. Moreover, the means for agglomeration is not limited to the pelletizer. The means for agglomeration may be a briquetter, a compactor, or an extruder. In making briquettes, the blast-furnace sludge may be dried in advance to a predetermined water content so as to prepare a mixed material having a water content of 1 percent by mass or less, and the mixed material may be directly press-formed into briquettes without drying. This is possible because making of briquettes does not require the mixed material to have a high water content. In this manner, the drying step between the agglomeration step and the feeding step can be omitted.

EXAMPLE 1

An experiment was conducted using blast-furnace sludge and basic-oxygen-furnace dust having the compositions shown in Table 1. The water content of the blast-furnace sludge was 14 percent by mass. Mixtures were prepared by blending the blast-furnace sludge and the basic-oxygen-furnace dust at different ratios. Each mixture was mixed in a ribbon mixer for 2 minutes while adding water to prepare a mixed material. The mixed material was agglomerated into green pellets having a diameter of approximately 14 mm using a pan pelletizer having a diameter of 1 m. The water content of the green pellets was 13 to 14 percent by mass. The green pellets were dried with a small dryer to reduce the water content to 1 percent by mass or less so as to prepare dry pellets. The dry pellets were placed in two layers in a small furnace maintained at 1,230° C. for 20 to 25 minutes to obtain reduced iron. The crushing strength of the reduced iron in the upper layer and that in the lower layer were measured. During the reduction, a gas having $CO_2/N_2=20$ percent by volume/80 percent by volume was charged into the small furnace so as to simulate the actual atmosphere of a furnace equipped with burners.

Figure 3A:
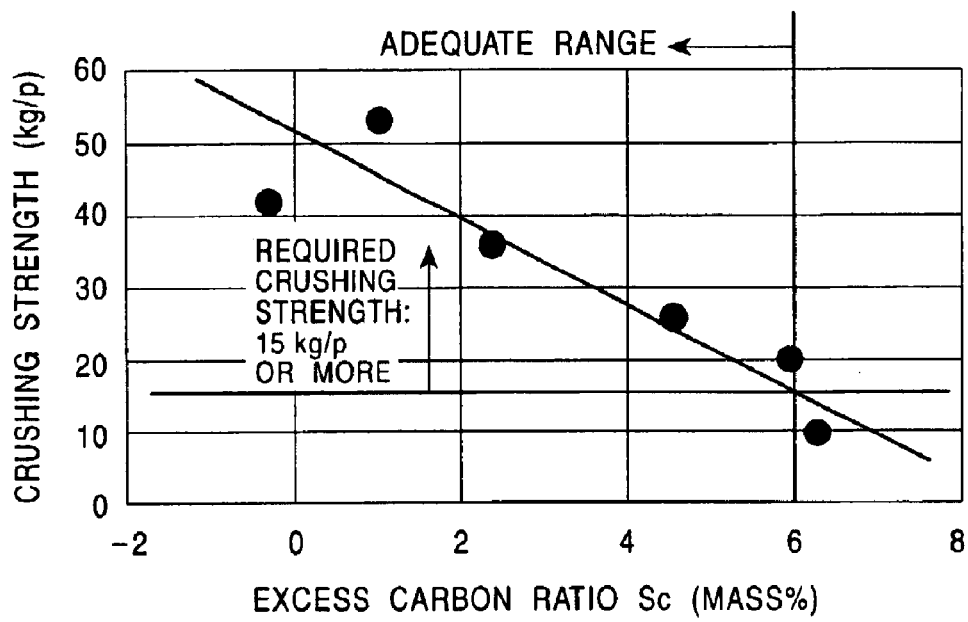
FIG. 3A is a graph showing the relationship between the excess carbon ratio Sc of pellets in an upper layer and the crushing strength of the resulting reduced iron.
Figure 3B:
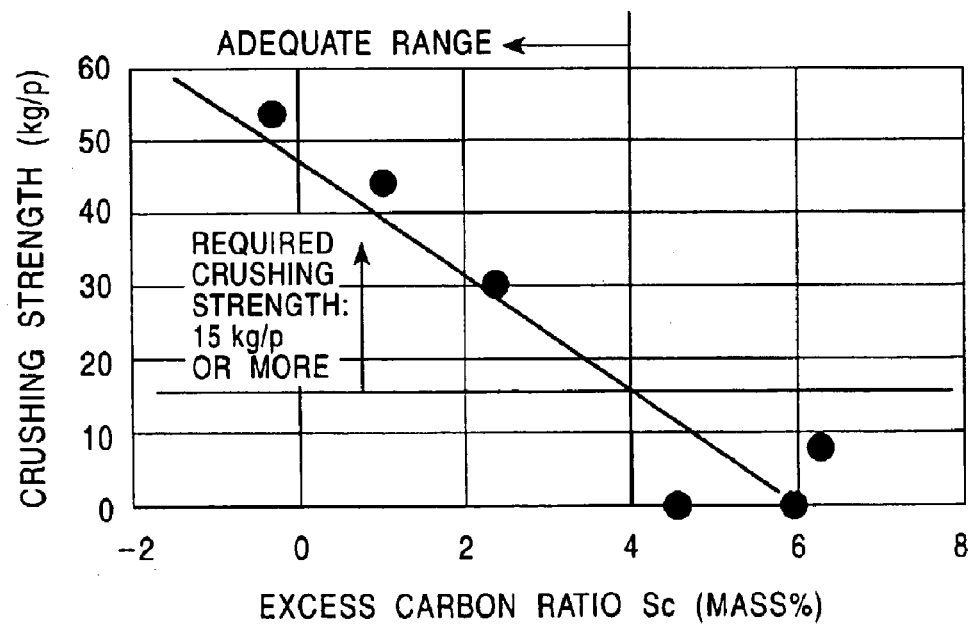
FIG. 3B is a graph showing the relationship between the excess carbon ratio Sc of pellets in a lower layer and the crushing strength of the resulting reduced iron.

The experimental results are shown in FIGS. 3A and 3B. FIG. 3A is a graph showing the relationship between the excess carbon ratio Sc of the pellets in the upper layer and the crushing strength of the reduced iron. FIG. 3B is a graph showing the relationship between the excess carbon ratio Sc of the pellets in the lower layer and the crushing strength of the reduced iron. As shown in FIGS. 3A and 3B, the crushing strength of the reduced iron substantially linearly decreased as the excess carbon ratio Sc was increased.

An investigation had been made as to the relationship between the breaking of the reduced iron and the crushing strength in actual operations. It was found that the crushing strength of the reduced iron must be at least 15 kg/p in order to prevent breaking of the pellets during the reduction step. Accordingly, from the results shown in FIGS. 3A and 3B, it can be concluded that in order to prevent pellets from breaking during the reduction when the average number NL of pellet layers is 2, the excess carbon ratio Sc must be 4 percent by mass or less to allow the pellets at the lower layer to achieve the crushing strength of 15 kg/p. When the average number NL of the pellet layers is 1, only the results regarding the pellets in the upper layer, i.e., the results shown in FIG. 3A, need to be considered. In particular, the excess carbon ratio should be 6 percent by mass or less in order to prevent pellets from breaking during the reduction. The experimental results above derive relationship (1) described above. In the experiment, a high zinc removal rate of 95% or more and a high metallization of 80% or more were achieved when the range of the excess carbon ratio was $Sc \geq -0.3$.

TABLE 1

| | | | | | (mass % on a dry basis) | | |
| --- | --- | --- | --- | --- | --- | --- | --- |
| | T. Fe | FeO | M. Fe | Zn | C | CaO | $SiO_2$ |
| Blast-furnace sludge | 29.2 | 4.7 | 0.7 | 1.0 | 36.6 | 4.0 | 4.5 |
| Basic-oxygen-furnace dust | 57.9 | 2.9 | 0.0 | 2.9 | 1.0 | 5.5 | 0.8 |

EXAMPLE 2

In addition to the blast-furnace sludge and the basic-oxygen-furnace dust used in Example 1, a carbonaceous substance for replacing carbon of the blast-furnace sludge was used. The carbonaceous substance was either coke dry quencher (CDQ) dust or pulverized coal. Mixtures were prepared by blending the blast-furnace sludge, the basic-oxygen-furnace dust, and the CDQ dust or the pulverized coal at different ratios. Reduction was conducted under the same conditions as in Example 1.

Figure 4A:
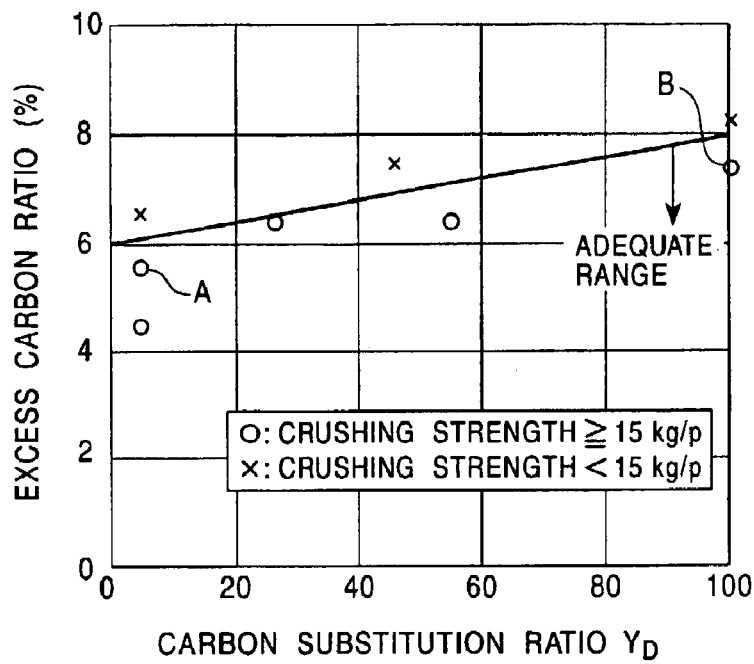
FIG. 4A is a graph showing combinations of the carbon substitution ratio YD and the excess carbon ratio Sc of the pellets in the upper layer, and whether each of these combinations produced reduced iron having a crushing strength of 15 kg/p or more.
Figure 4B:
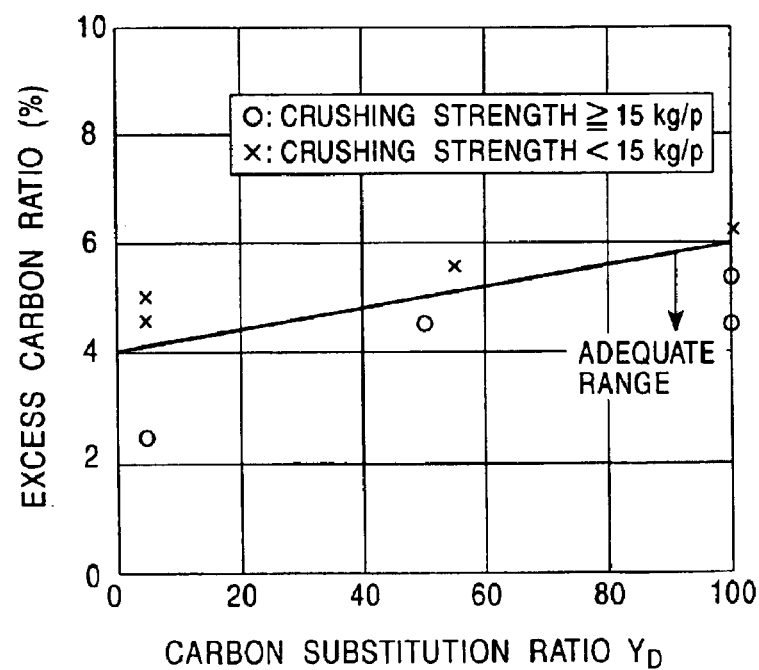
FIG. 4B is a graph showing combinations of the carbon substitution ratio YD and the excess carbon ratio Sc of the pellets in the lower layer, and whether each of these combinations produced reduced iron having a crushing strength of 15 kg/p or more.

The experimental results are shown in FIGS. 4A and 4B. FIG. 4A is a graph showing combinations of the carbon substitution ratio YD and the excess carbon ratio Sc of the pellets in the upper layer, and whether each of these combinations produced reduced iron having a crushing strength of 15 kg/p or more. FIG. 4B is a graph showing combinations of the carbon substitution ratio YD and the excess carbon ratio Sc of the pellets in the lower layer, and whether each of these combinations produced reduced iron having a crushing strength of 15 kg/p or more.

FIGS. 4A and 4B demonstrate that the upper limit of the excess carbon ratio Sc that can achieve crushing strength of 15 kg/p or more substantially linearly increased as the carbon substitution ratio YD increased. These experimental results derived relationship (2) described above. In FIG. 4A, the pellets reduced under the conditions indicated by reference character A (YD=5%, Sc=5.6 percent by mass) had a metallization degree of 85%. In contrast, the pellets reduced under the conditions indicated by reference character B (YD=100%, Sc=7.5 percent by mass) had a metallization degree of 90%. This demonstrates that an increase in carbon substitution ratio YD results in an increase in the upper limit of the excess carbon ratio Sc and in improving the quality of the reduced iron product.

TABLE 2

(mass %)

|  | Ash | Volatile component | Fixed carbon |
|---|---|---|---|
| CDQ dust | 14.6 | 0.0 | 85.4 |
| Pulverized coal | 8.8 | 19.6 | 71.6 |

EXAMPLE 3

An experiment was conducted using the blast-furnace sludge and the basic-oxygen-furnace dust having the compositions shown in Table 1 of Example 1. The blast-furnace sludge was classified into particles having a diameter of less than 1 mm and particles having a diameter of 1 to 2 mm using a screen. Mixtures were prepared by blending the blast-furnace sludge having a particle diameter of 1 to 2 mm, the blast-furnace sludge having a particle diameter of less than 1 mm, and the basic-oxygen-furnace dust at different ratios. Each of the mixtures was mixed by a ribbon mixer for two minutes while adding water to prepare a mixed material. The mixed material was agglomerated into green pellets having a diameter of approximately 14 mm using a pan pelletizer having a diameter of 1 m. The water content of the green pellets was 13 to 14 percent by mass. The green pellets were dried in a small dryer to reduce the water content to 1 percent by mass or less so as to obtain dry pellets. The dry pellets were placed in a small oven maintained at 1,230° C. for 20 to 25 minutes so as to obtain reduced iron. The extent of breaking of the pellets resulting from the reduction was then examined. During the reduction, a gas having $CO_2/N_2$=20 percent by volume/80 percent by volume was charged in the small furnace so as to simulate the actual atmosphere of a furnace equipped with burners.

The extent of breaking of the pellets resulting from the reduction was determined by the ratio of the number of the reduced pellets that maintained the original spherical shape under observation with naked eyes to the total number of the dry pellets originally fed into the small furnace. This ratio is hereinafter referred to as the "shape-maintaining ratio". In the experiment, 15 pellets were placed in the small furnace each time. The conditions that produced 13 or more pellets maintaining the original shape, i.e., that achieved the shape-maintaining ratio of 86.7% or more, were assumed as the preferable conditions that can effectively prevent breaking of the pellets. The conditions that allowed all 15 pellets to maintain the original shape, i.e., that achieved the shape-maintaining ratio of 100%, were assumed as the optimum conditions.

Figure 5:
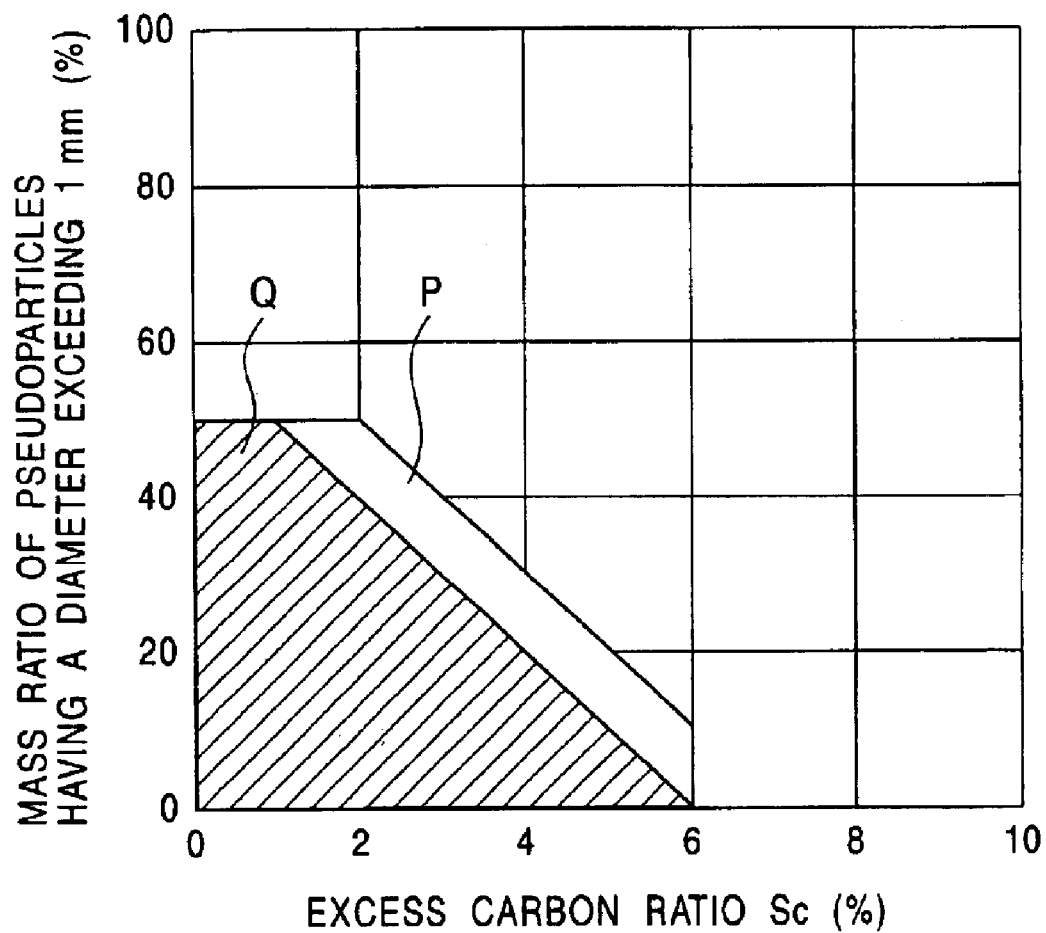
FIG. 5 is a graph showing an optimum range and a preferred range of combinations of the excess carbon ratio Sc and the mass ratio XQ of the pseudoparticles having a diameter exceeding 1 mm that can prevent pellets from breaking into chips and fines during heating and reduction.

The experimental results are shown in FIG. 5. FIG. 5 shows regions indicating the optimum conditions, the preferable conditions, and inadequate conditions among the combinations of the excess carbon ratio Sc and the mass ratio XQ of the pseudoparticles having a diameter exceeding 1 mm. In FIG. 5, a region P indicates the region of the preferable conditions, a region Q indicates the region of the optimum conditions, and the region outside the regions P and Q indicates the region of the inadequate conditions that produce significant degree of pellet breaking. The reduced iron manufactured under the conditions in the regions P and Q showed higher zinc-removal rate and metallization degree than those of the reduced iron manufactured under the conditions in the region outside the regions P and Q.

What is claimed is:

1. A method for making reduced iron using blast-furnace sludge, the method comprising:

a mixing step of mixing the blast-furnace sludge with an iron-oxide-containing powder and/or a carbonaceous powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein the mixed material has an excess carbon ratio Sc that satisfies the relationship:

$$Sc \leq 8-2NL$$

wherein Sc=XC−(12/16)·XO, NL represents an average number of layers of the agglomerates on the moving hearth, XC represents the mass ratio (percent by mass) of carbon in the agglomerates in a dry state, and XO represents a total mass ratio (percent by mass) of oxygen in iron oxides and oxygen in zinc oxide in the dry agglomerates.

2. A method for making reduced iron using blast-furnace sludge, the method comprising:

a mixing step of mixing the blast-furnace sludge with an iron-oxide-containing powder and/or a carbonaceous powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein the mixed material has an excess carbon ratio Sc that satisfies the relationship:

$$Sc \leq 8-2NL+0.02YD$$

wherein Sc=XC−(12/16)·XO, NL represents an average number of layers of agglomerates on the hearth, $YD=100XC_B/XC$, XC represents a mass ratio (percent by mass) of carbon in dried agglomerates, XO represents a total mass ratio (percent by mass) of oxygen in iron oxides and oxygen in zinc oxide in the agglomerates in a dry state, and $XC_B$ represents a mass ratio (percent by mass) of carbon in the iron-oxide-containing powder and/or the carbonaceous powder in the dry agglomerates.

3. The method in accordance with claim 1, wherein, in the feeding step, the average number NL is 1.0 or less.

4. The method in accordance with claim 2, wherein, in the feeding step, the average number NL is 1.0 or less.

5. The method in accordance with claim 1, further comprising a disintegrating step of disintegrating the blast-furnace sludge.

6. The method in accordance with claim 5, wherein the blast-furnace sludge contains pseudoparticles having a diameter exceeding 1 mm; and, in the disintegrating step, the blast-furnace sludge containing pseudoparticles having a diameter exceeding 1 mm is disintegrated to reduce the mass ratio of the pseudoparticles having a diameter exceeding 1 mm to the mixed material to 50% or less.

7. A method for making reduced iron using blast-furnace sludge, the method comprising:

a mixing step of mixing the blast-furnace sludge with an iron-oxide-containing powder and/or a carbonaceous powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein the method further comprises a disintegrating step of disintegrating the blast-furnace sludge; and wherein the mixed material has a mass ratio XQ (percent by mass) of pseudoparticles having a diameter exceeding 1 mm and an excess carbon ratio Sc (percent by mass) that satisfy the relationships:

when $0 \leq Sc \leq 2$, $XQ \leq 50$; and when $2 < Sc \leq 6$, $XQ \leq 70-10 \cdot Sc$ wherein $Sc = XC - (12/16) \cdot XO$, XC is a mass ratio (percent by mass) of carbon in the agglomerates in a dry state, and XO is a total mass ratio (percent by mass) of oxygen in iron oxides and oxygen in zinc oxide in the dry agglomerates.

8. A method for making reduced iron using blast-furnace sludge, the method comprising:

a mixing step of mixing the blast-furnace sludge with an iron-oxide-containing powder and/or a carbonaceous powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein the method further comprises a disintegrating step of disintegrating the blast-furnace sludge; and wherein the mixed material has a mass ratio XQ (percent by mass) of pseudoparticles having a diameter exceeding 1 mm and a excess carbon ratio Sc (unit: percent by mass) that satisfy the relationships:

when $0 \leq Sc \leq 1$, $XQ \leq 50$; and when $1 < Sc \leq 6$, $XQ \leq 60-10 \cdot Sc$ wherein $Sc = XC - (12/16) \cdot XO$, XC is a mass ratio (percent by mass) of carbon in the agglomerates in a dry state, and XO is a total mass ratio (percent by mass) of oxygen in iron oxides and oxygen in zinc oxide in the dry agglomerates.

9. The method in accordance with claim 1, further comprising an agglomerates-drying step of drying the agglomerates to reduce the water content thereof to 1.0 percent by mass or less.

10. The method in accordance with claim 1, further comprising a blast-furnace-sludge-drying step of drying the blast-furnace sludge to reduce the water content thereof to a predetermined value so that the water content of the mixed material becomes 1.0 percent by mass or less.

11. The method in accordance with claim 1, further comprising a zinc-recovering step of recovering zinc compounds resulting from zinc removal to obtain crude zinc oxide.

12. A method for making reduced iron using blast-furnace sludge, comprising:

a mixing step of mixing the blast-furnace sludge and an iron-oxide-containing powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein the mixed material is prepared so that the excess carbon ratio Sc satisfies the relationship:

$Sc \leq 8 - 2NL$ wherein $Sc = XC - (12/16) \cdot XO$, NL represents an average number of layers of the agglomerates on the moving hearth, XC represents the mass ratio (percent by mass) of carbon in the agglomerates in a dry state, and XO represents a total mass ratio (percent by mass) of oxygen in iron oxide and oxygen in zinc oxide in the dry agglomerates.

13. A method for making reduced iron using blast-furnace sludge, the method comprising:

a drying step of driving the blast-furnace sludge and forming from the blast-furnace sludge pseudoparticles having a diameter exceeding 1 mm that are harder than the remainder of the dried blast-furnace sludge;

a disintegrating step of disintegrating at least a portion of the pseudoparticles having a diameter exceeding 1 mm;

a mixing step of mixing the blast-furnace sludge and an iron-oxide-containing powder to prepare a mixed material;

an agglomerating step of agglomerating the mixed material to form agglomerates;

a feeding step of feeding the agglomerates onto a continuously moving hearth; and a reducing step of heating the agglomerates to remove zinc as well as to reduce the agglomerates, wherein in the mixed material the mass ratio of the pseudoparticles having a diameter exceeding 1 mm to the mixed material is 50% or less.

* * * * *

UNITED STATES PATENT AND TRADEMARK OFFICE
CERTIFICATE OF CORRECTION

PATENT NO.   : 6,918,947 B2  
DATED        : July 19, 2005  
INVENTOR(S)  : Maki et al.

Page 1 of 1

It is certified that error appears in the above-identified patent and that said Letters Patent is hereby corrected as shown below:

<u>Title page,</u>  
Item [73], should read:  
-- [73] Assignee: Kabushiki Kaisha Kobe Seiko Sho (Kobe Steel, Ltd.), Kobe (JP) --.

Signed and Sealed this

Sixth Day of September, 2005

JON W. DUDAS  
*Director of the United States Patent and Trademark Office*